United States Patent [19]

Segarra

[11] Patent Number: 4,609,920
[45] Date of Patent: Sep. 2, 1986

[54] METHOD OF AND DEVICE FOR ALLOCATING A TOKEN TO STATIONS OF A COMMUNICATION NETWORK HAVING AT LEAST TWO LOGIC LOOPS FOR THE CIRCULATION OF THE TOKEN, EACH LOOP HAVING AN ASSIGNED PRIORITY

[75] Inventor: Gérard Segarra, Jossigny, France

[73] Assignee: U.S. Philips Corporation, New York, N.Y.

[21] Appl. No.: 494,469

[22] Filed: May 13, 1983

[30] Foreign Application Priority Data

May 18, 1982 [FR] France ............................ 82 08685

[51] Int. Cl.⁴ .................... H04Q 3/00; H04Q 5/00; H04Q 11/00
[52] U.S. Cl. .................... 340/825.51; 340/825.05; 340/825.07; 340/825.5; 370/85; 370/86; 370/88
[58] Field of Search ............... 340/825.05, 825.07, 340/825.12, 825.5, 825.51; 370/85, 86, 88, 94

[56] References Cited

U.S. PATENT DOCUMENTS 4,404,557  9/1983  Grow ............................ 340/825.05

Primary Examiner—Ulysses Weldon
Assistant Examiner—David W. Olson
Attorney, Agent, or Firm—Jack E. Haken; James J. Cannon, Jr.

[57] ABSTRACT

A decentralized local communication network comprising a plurality of stations. A right to transmit data on a traffic channel, to which each station is connected, is allocated by means of a token. At least one priority level indicating a frequency of allocation of the token assigned to each station, the stations having the same priority level form part of a same group and are assigned to a logic loop for the circulation of the token. The network comprises at least two logic loops. With each priority level there is associated a predetermined time interval which corresponds to a period of time expiring between two successive allocations of the token to a station of the group having said associated priority level. Upon expiration of one of said time intervals, the token passes to the logic loop which is associated to the priority level for which said time interval was expired and starts to circulate in that logic loop.

9 Claims, 3 Drawing Figures

METHOD OF AND DEVICE FOR ALLOCATING A TOKEN TO STATIONS OF A COMMUNICATION NETWORK HAVING AT LEAST TWO LOGIC LOOPS FOR THE CIRCULATION OF THE TOKEN, EACH LOOP HAVING AN ASSIGNED PRIORITY

BACKGROUND OF THE INVENTION

1. Field of the Invention

The invention relates to a method of allocating a right to transmit to different stations which form part of a decentralized communication network and each of which is connected to a data traffic channel, the right to transmit being allocated to the various stations by means of a token in an order to be determined, at least one priority level for the allocation frequency of the token being assigned to each station, the stations having the same priority level forming part of the same group and the network comprising at least two different groups.

2. Description of the Prior Art

A method of this kind is described, for example, in an article by M. Stieglitz, entitled "An LSI token Controller", published in IEEE Digest of Papers, Compcon Spring 1982, Twenty-Fourth IEEE Computer Society International Conference, Feb. 22–25, 1982, San Francisco, Calif., pages 115–120. The various stations form part of decentralized communication network. Contrary to a centralized communication network, such a decentralized network does not comprise a pilot station which manages the protocol for the various stations for access to the channel. The token circulates on the channel and grants the right to transmit to the various stations in a predetermined order. This predetermined order is not necessarily the order in which the stations are physically connected to the network, but rather a logic order.

There are several general transmission modes for the token. The transmission of the token may be performed in a first mode which is referred to as the random mode, for example, as in the method known as CSMACD (Carrier Sense Multiple Access with Collision Detection); according to this method, each station may claim the token at any instant.

The transmission of the token may also be performed in a second mode, referred to as the designated mode; this mode is either implicit as in the method described in U.S. Pat. No. 4,495,493, explicit by utilizing a particular transmission frame of the token which contains the functional or physical address of the station whereto the token will be allocated.

The method in accordance with the present invention concerns the transmission of the token according to said explicit designated mode. Certain stations have a priority which is higher than that of other stations; this means that during an allocation cycle of the token during which all stations receive the right to transmit, such stations of higher priority will receive this right more often than the other stations.

According to the method disclosed in said article, the use of the token allocated to the stations of lower priority is deferred in order to allocate the token more often to the stations of higher priority. It is a drawback of this method that when there are stations having a very high priority level, the stations which have a low priority level can only pass on the token without using it, thus causing network overloading, so that the allocation of the token to the stations of higher priorities is delayed.

In the known explicit designated modes all stations are connected to the same logic loop; each station knows its successor at any instant, even though the successor of a station may change in time due to the starting and stopping of the various stations. In any case, according to the known methods the stations of the network are connected only to a single address; moreover, the token circulates only cyclically on the channel so that a station is obliged to wait for its predecessor to pass on the token in order to enable transmission.

These characteristics of the known methods are not without drawbacks, because there are often given stations which have to transmit with well defined time intervals. The method in accordance with the invention has for its object to mitigate such drawbacks.

SUMMARY OF THE INVENTION

To this end, a method of allocating a right to transmit in accordance with the invention is characterized in that the stations of the same group are assigned to the same logic loop for the circulation of the token, said token successively passing from station to station in the same logic loop and, when the token has been allocated to all stations of the same logic loop, it passes to another logic loop assigned to a group of stations having a lower priority level, said circulation of the token in a first logic loop being interrupted under the control of an interrupt signal which is generated by the station possessing the token upon expiration of a time interval between two successive allocations of the token to a station assigned to a second logic loop having a priority level which is higher than that of the first logic loop, said token then passing to said second logic loop under the control of the interrupt signal.

Due to the assignment of the stations of the same logic loop, the token will successively circulate in each logic loop and the stations assigned to the second logic loop will obtain the token before the other stations; moreover, the circulation of the token in the first logic loop will by systematically interrupted under the control of the interrupt signal in order to assign the token again to the second logic loop with the result that the stations of the second logic loop will receive the token more often than the other stations. The priority of a station with respect to the other stations is linked to a time interval which indicates that the period of time expiring between two successive allocations to the same station is predetermined and must be respected. Because the interrupt signal is generated each time upon expiration of said time interval, the relevant station will be served at the required instant.

The token thus passes from one logic loop to another with priority for the logic loop whereto the group of stations having the highest priority is assigned, and subsequently passes downwards to the logic loop whereto the group of stations having the lowest priority level is assigned. The priorities are thus respected while at the same time each station is granted the right to transmit with a given regularity.

A preferred allocation method in accordance with the invention is characterized in that when the token returns to the first logic loop after circulation through the second logic loop, the right to transmit is allocated first of all to the station which possessed this right to transmit when the interrupt signal appeared. It is thus avoided that there are stations which are only rarely served.

Preferably, an allocation method in accordance with the invention is characterized in that for each group of stations assigned to the same logic loop a first station is designated to first receive the right to transmit when the token passes from one logic loop to another under the control of said interrupt signal. The passing of the token can thus be simply performed by despatching the token to said first station.

A further preferred allocation method in accordance with the invention is characterized in that said time interval between two successive allocations of the token corresponds to the predetermined time interval between two successive allocations of the token to said station designated to first receive the right to transmit.

A preferred allocation method in accordance with the invention is characterized in that the duration of said time interval is less than 10 milliseconds.

The invention also relates to a decentralized communication network comprising a plurality of stations, each of which is connected to a data traffic channel, and comprises token allocation means for receiving the right to transmit a message on the channel when the token is allocated thereto and for organizing the transfer of the token to a predetermined station, at least one priority level for the allocation frequency of the token being assigned to each station, the stations having the same priority level forming part of the same group and the network comprising at least two different groups.

A communication network in accordance with the invention is notably characterized in that the stations of the same group are assigned to the same logic loop, said predetermined station whereto the token is transferred being a next station of the same logic loop or a station of a logic loop assigned to a lower priority level when the token has been allocated to all stations of the former logic loop. Each priority level is associated with a predetermined time interval which corresponds to the period of time expiring between two successive allocations of the token by the allocation means of a station of a group assigned to said associated priority level, the stations having an assigned priority level which is lower than the highest priority level comprising a time counting device for counting the duration of said time intervals corresponding to the priority levels which are higher than that of the station itself. Said counting device is provided in order to generate an interrupt signal upon expiration of one of said time intervals and is connected to said token allocation means for the transmission of said interrupt signal and for the transmission of an indication which indicates for which priority level the time interval has expired, said token allocation means being provided in order to interrupt, under the control of said interrupt signal, said transfer of the token to said predetermined station and to organize the transfer of the token to a station of the group indicated by said indication. Thus, a decentralized communication network is obtained in which the allocation priority of the token to the stations having a higher priority level is based on the expiration of a time interval.

A first preferred embodiment of a communication network in accordance with the invention is notably characterized in that the time counting device comprises a time counting element for each group having a priority level which is higher than that of its own group, each counting element counting the duration of said time interval of the group whereto it is assigned.

Preferably, a communication network in accordance with the invention comprises two logic loops. This is an embodiment which can be very simple implemented due to the fact that the stations belonging to the logic loop having the lower priority level only require a single time counting element.

Preferably, the time counting element in a communication network in accordance with the invention is resettable under the control of the interrupt signal.

BRIEF DESCRIPTION OF THE DRAWINGS

The invention will be described in detail hereinafter with reference to the following figures.

DESCRIPTION OF THE PREFERRED EMBODIMENT

Figure 1:
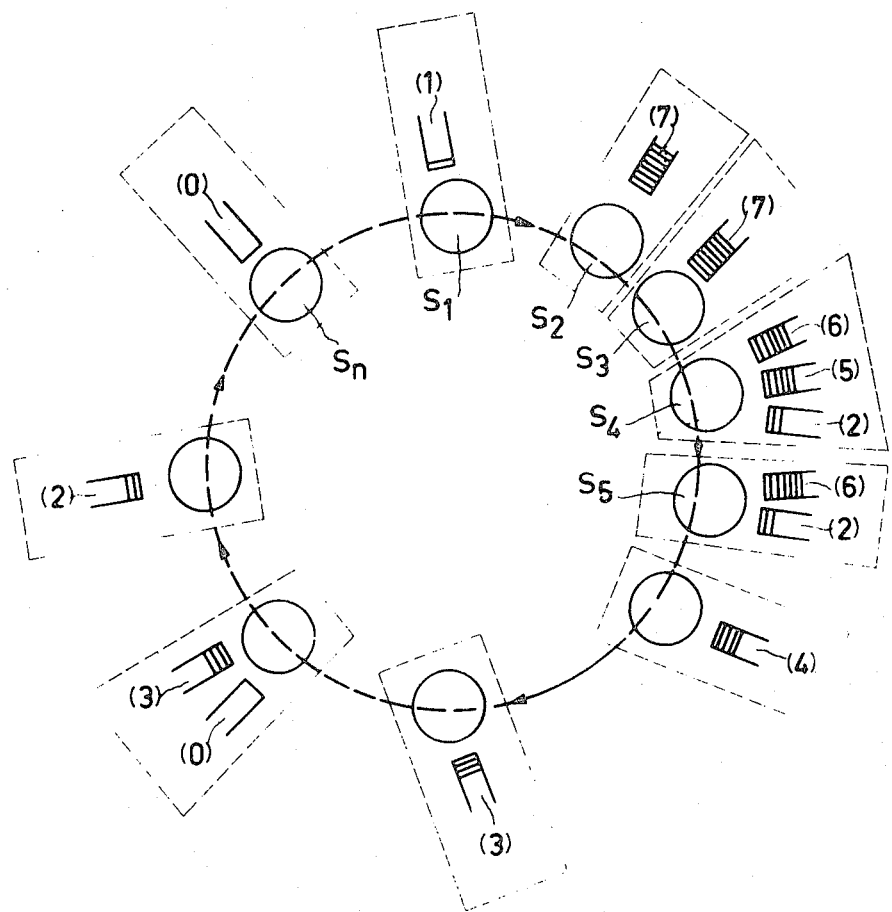
FIG. 1 shows a logic diagram of a communication network.

FIG. 1 shows a logic diagram of a communication network. A logic diagram is to be understood to mean herein a diagram in which the various stations are arranged in the order in which they are successively addressed. This logic diagram does not necessarily correspond to the physical diagram, which means that the stations are not necessarily addressed in the order in which they are physically connected to the network. The various stations (S1, S2, . . . Sn) are not necessarily physically different; for example, the station Si may be physically the same as the station Sn, which means that during an allocation cycle this same physical station will be addressed twice. When a station is addressed, it has the right (and is some cases it is even obliged) to tranmit one or more messages on the channel which serves for the transmission of messages in the communication network. The logic access to the channel is based on a token or a "right to transmit" which circulates in the network. A logic access to the channel on the bases of a token is described, for example, in an article by D. D. Clark, K. T. Pogran and D. P. Reed, entitled "An introduction to local area Networks", published in "Proceedings of the IEEE", Vol. 66, No. 11, November 1978, pages 1491–1517, notably in section B "Network control Structures" on page 1501. When a station obtains the token, it can (in some cases it even must) transmit one or more messages and/or transfer the token to another station; on the other hand, when a station does not possess the token it "listens to" the messages being transported on the network and is notably on the lookout for the messages which control the transmission of the token. The token itself is formed, for example, by a message in the following form:

| Preamble | Frame format | DA | SA | FCS |

The preamble may contain the synchronization bits, control bits etc. The frame format indicates that the message is the token. DA indicates the address of the destination station for the token. SA indicates the address of the station which had the token last and which has transmitted the token on the channel. FCS are the control bits (on this subject see, for example, the Orange Book, Volume VIII.2 of CCITT, notably section 2.2.7).

In accordance with the invention, each station may be assigned to one or more priority levels as a function of the desired transmission priority (priorities).

There may thus be, for example, eight priority levels (numbered 0 through 7). These priority levels are indicated for the various stations of FIG. 1 by means of priority scales, the number of scale graduations indicating the priority level. The priority levels are also indicated between parentheses. For example, in FIG. 1 the priority level "1" is assigned to the station S1 and the priority level "7" is assigned to the stations S2 and S3, these stations being assigned only to a single priority level; this is in contrast with the station S4 which is assigned to three priority levels, notably the levels "2, 5 and 6". The higher the priority level (or levels) of a station, the more often it can obtain the token.

The assignment of one or more priority levels to a station is perfomed, for example, on the basis of the function (or functions) of the relevant station. For example, for the station S5 the priority level 2 is assigned when the station is a consumer of the service and the priority level 6 is assigned when the station is a producer of the service.

For a better understanding of the assignment of one or more priority levels to a station, the case will be considered where a local network comprises, among other types of stations, one or more consumer-type stations and one or more producer-type stations.

A typical example of a producer-type station is a station which is capable of supplying a consumer with documents, texts or figures having the format A4 or another format, said documents being stored, for example, in the form of digital optical records comprising from 1 to 4 Mbits; this type of producer will be referred to as DOR (Digital Optical Recording) hereinafter.

Considering that the output of a DOR is in the order of 2.4 Mbits per second so that the output of the network is, for example, in the order of 4 Mbits per second and if the size of the output buffer of the DOR is to be limited to, for example, 16 kbits (2 K byte) for cost considerations, the output buffer will be filled after 16,000/2,400,000=6.66 milliseconds; therefore, the DOR should obtain the token every 6 milliseconds (6<6.66) in order to empty its output buffer by transmitting a 16 kbit frame to the consumer; the set of frames received will enable the consumer to reconstruct the image and, for example, to display it on a screen.

Thus, in this non-limitative example it appears that for reasons of economy (output buffer limited to 16 kbits) the token must definitely be allocated to the DOR after a predetermined period of time which amounts to 6 milliseconds in this case; therefore, the DOR must have a priority.

Aside from the reasons of economy, there may also be reasons of quality of service the total period of time which is acceptable to the consumer for the transmission of the complete picture which also necessitate the granting of a priority to given stations.

The DOR should receive a priority for the allocation of the token because it cannot wait for its predecessor to pass on the token because the waiting time would be a function of the number of stations connected to the logic loop and of the traffic of the stations, so that it could be longer than the predetermined period of 6 milliseconds.

A station address, being a logic address and not a physical address, is composed of at least two parts: a first part which contains the priority level and a second part which contains, for example, a number indicating the relevant station. A station assigned to several priority levels will, therefore, have several logic addresses. The various logic addresses of the same station are stored, for example, in a table which forms part of the relevant station. The active station having, for example, the largest number in its second part recognizes itself as being the initial entrance point of a logic loop comprising all stations of the same priority level. In a communication network in accordance with the invention, therefore, the token circulates in a logic loop and successively addresses the various stations of a logic loop. The number of logic loops will be equal to the number of priority levels.

The normal course of the token could be to traverse each loop completely at least once, starting with the loop having the highest priority and beginning in its initial entrance point, followed by the successive traversing of the other loops in a decreasing order of priority; however, such a course of the token would only be a simple transposition of the known methods.

Actually, in accordance with the invention the progress of the token in a loop will be disturbed by the interruption caused by the expiration of a predetermined time interval; when this interruption occurs, in accordance with the invention the token returns, regardless of its position, to the initial entrance point of a loop whose stations are assigned a priority level which is higher than the priority level of the stations associated with the loop in which the token circulated at the time of interruption.

The course of the token in reaction to said interruption will now be described with reference to an example in which the communication network comprises two logic loops. This example is by no way limitative and the invention is equally well applicable to communication networks comprising more than two logic loops. The choice of two loops merely serves to make the description simpler.

In the chosen example the communication network comprises n physical stations which are of the transmitter/receiver type. A station can transmit the message when it possesses the token. Each station "hears" the messages being transported on the network and takes into account the messages intended for the relevant station. A first group of stations is assigned to the first logic loop which will be referred to hereinafter as the synchronous loop, and a second group of stations is assigned to a second logic loop which will be referred to hereinafter as the asynchronous loop. The synchronous loop has a priority level which is higher than that of the asynchronous loop. As has already been mentioned, the same physical station may belong to both logic loops. In accordance with the invention, each station assigned to the synchronous loop will have the token at least once during a predetermined time interval, that is to say at least once every 6 milliseconds in the said example concerning a DOR. The stations assigned to the asynchronous loop can dispose of the token only during the part of the predetermined time interval which is not used by the stations of the synchronous loop.

The token starts to circulate in the asynchronous loop in the sequential mode, which means that it is successively allocated, for example, in accordance with the numbers contained in the second part of the address, to all stations assigned to this asynchronous loop. However, upon expiration of the predetermined time interval, the sequential mode is interrupted and replaced by the interrupt mode during which the token is allocated to the stations assigned to the synchronous loop. When all stations of the synchronous loop have been served, the token will assume the sequential mode again.

Figure 2:
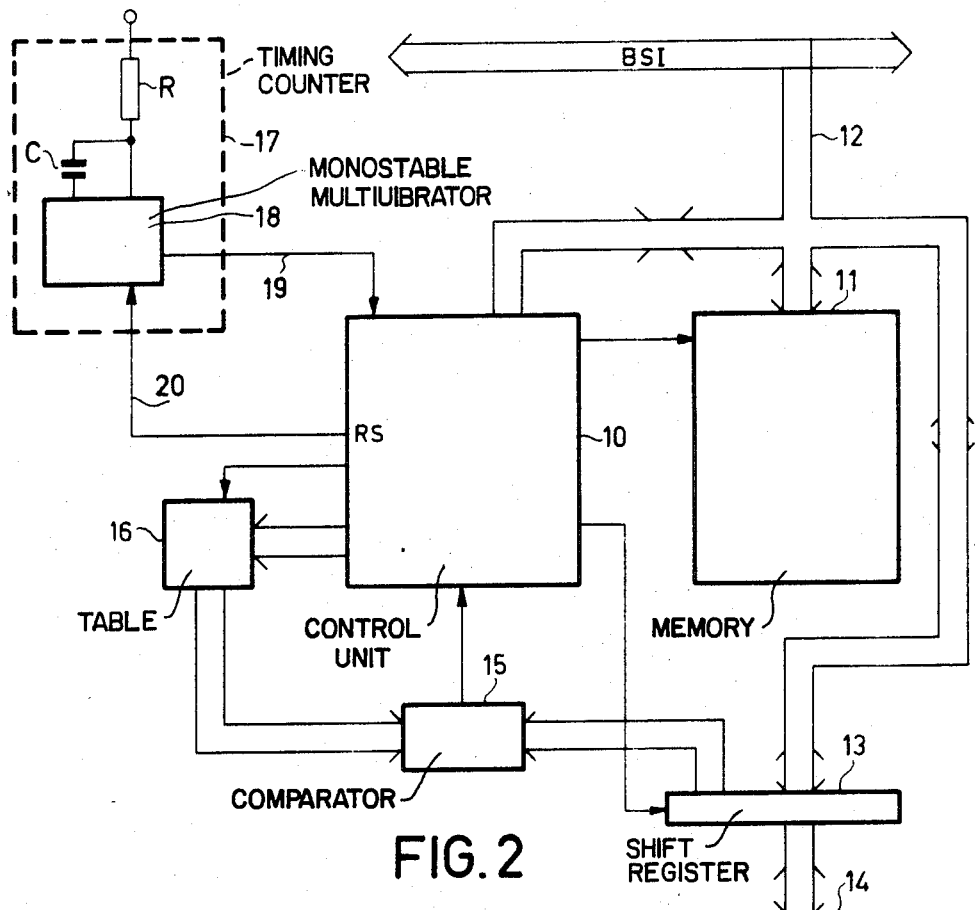
FIG. 2 shows an embodiment of a station forming part of a communication network in accordance with the invention.

The description of the passage of the token from the sequential mode to the interrupt mode will be preceded by a description of some essential elements of a station forming part of the communication network. FIG. 2 illustrates an example of a station. FIG. 2 only shows the elements which are necessary for a proper understanding of the invention. The operation of the station is controlled by a control unit 10, for example, a microprocessor. This control unit is connected, by way of a bus 12, to the internal bus (BSI) of the station; to this internal bus there are also connected, for example, the upper layers of the station (these upper layers are not shown in FIG. 2 for the sake of clarity). A memory 11 is also connected to the bus 12 on which the addresses and data circulate. This memory is provided for the temporary storage of data from the internal bus BSI, the control unit, and the channel 14 which forms part of the communication network. The channel is connected to the station via a shift register 13. An output of the shift register is connected to a first input of a comparator 15, a second input of which is connected to an output of a table 16. This table 16 stores the address (addessess) of the station and, for each address, the address of the preceding station and the address of the next station in the logic loop with respect to the relevant station, even as a status variable indicating whether the station occupies a particular position in the loop, for example, initial entrance point or exit point. An input of the table is connected to the control unit 10. An output of the comparator is connected to the control unit. The station also comprises a time counting device 17, an output of which is connected to an input of the control unit, via the line 19, while an input is connected, via the line 20, to an output RS (RESET) of the control unit.

When the token circulates on the channel 14, the station verifies whether the token is addressed to this station. To this end, the station loads, via the register 13, a copy of the part DA of the token into the comparator 15. The comparator verifies if this part DA of the token comprises one of the addresses of the staton mentioned in the table 16. If the part DA of the token does not comprise one of these addresses of the station, the result of the comparison performed by the comparator 15 is negative so that the station is not the destination; this indicates that it does not have the right to transmit a message on the channel. The comparator applies this information "result negative" to the control unit which thus awaits the next passage of the token. If the part DA of the token comprises one of the addresses of the station, the comparator 15 applies a positive result to the control unit 10 which indicates that this station has the right to transmit a message on the channel. Under the control of the control unit, the message to be transmitted is fetched from a memory 11 in order to be transmitted on the channel 14. The control unit also modifies the content of the token. Thus, the logic address of the present station will be loaded into the part SA of the token, said logic address being the address of the present station with respect to the logic loop on which the token circulates when it is taken into account by the station. It being understood that the token circulates in the sequential mode, the logic address of the station which directly follows the present station on the logic loop in question is loaded into the part DA of the token. This address to be loaded into the part DA of the token is fetched from the table 16. The token whose content has been modified is then transmitted on the channel.

However, as has already been stated, the token may change over from the sequential mode to the interrupt mode. This passage will take place each time after expiration of a predetermined time interval. This time interval is predetermined on the basis of the frequency with which the station of highest priority of the synchronous loop must be in possession of the token, so every 6 milliseconds in the example involving the DOR. In order to ensure that each station knows this predetermined time interval, each station comprises a time counting device 17. In the example shown in FIG. 2 this time counting device is formed by a monostable multivibrator 18 whose time constant T is determined by the resistor R and the capacitor C. This time constant T is equal to said predetermined time interval. The choice of a monostable multivibrator comprising the passive elements R and C is merely an example; any settable counter can actually be used for this purpose.

Figure 3:
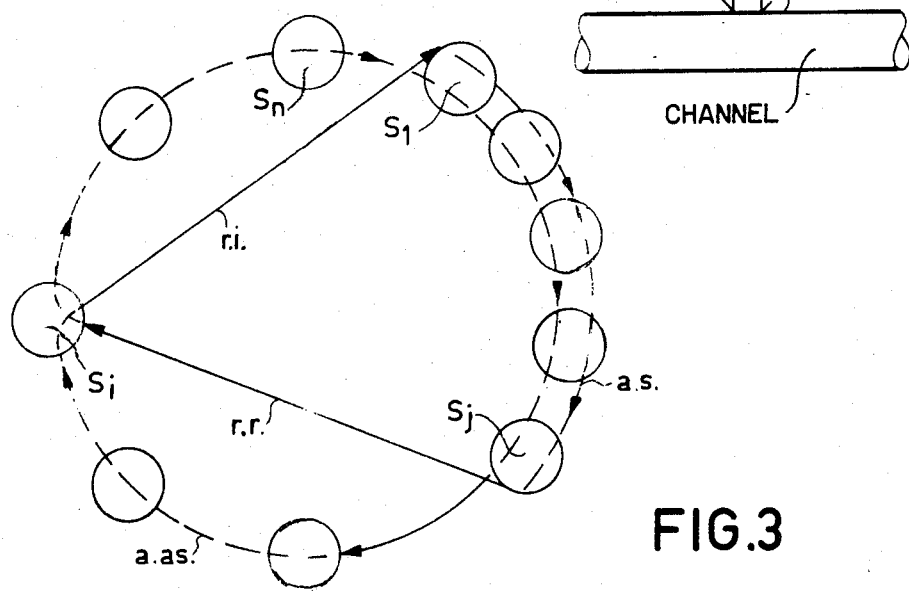
FIG. 3 illustrates the transfer of the token from one logic loop to another.

Assuming that the token circulates in the asynchronous loop in the sequential mode upon expiration of the predetermined time interval, the time counting device 17 outputs an interrupt signal which is applied, via the line 19, to an input of the control unit 10. When the control unit receives such an interrupt signal, it immediately verifies whether the station possesses the token. If the station is not in the possession of the token, it awaits the transmission of the token in the channel and the control unit generates a reinitialization signal which is applied to the input of the time counting device 17 via the line 20. Under the control of this reinitialization signal, the counter restarts the counting of the predetermined time interval. However, if the station is in the possession of the token when an interrupt signal is transmitted by the time counting device 17, the control unit 10 of the station transmits the token to the initial entrance point of the synchronous loop in the network and the control unit generates the reinitialization signal which is applied to the input of the time counting device 17. The control unit also memorizes that the station of which it forms part has been the subject of an interrupt signal and that it is now the last station of the asynchronous loop which has had the token before the passage of the token to the synchronous loop. This memorization is performed, for example, by the positioning of a flag. The token then starts to circulate in the synchronous loop in the interrupt mode. The token has thus changed over from the sequential mode in the asynchronous loop to the interrupt mode in the synchronous loop. This passage from the asynchronous loop (a. as.) to the synchronous loop (a.s.) is illustrated in FIG. 3. The station Si is the subject of an interrupt signal and the token passes (r.i.) to the station S1 which forms part of the synchronous loop. The entrance point of the synchronous loop (station S1) thus receives the right to transmit its message immediately after the expiration of said predetermined time interval. The token which then circulates in the interrupt mode starts to serve all stations which form part of the synchronous loop. Upon arrival of the token at the last station (station Sj in FIG. 3) of the synchronous loop, this station identifies itself, by way of its table 16, as being the last station of the synchronous loop. Actually, this last station (Sj) detects that its table 16 does not contain an address of a next station in the synchronous loop. On the basis of this information, the control unit of the latter station despatches the token to the station previously interrupted (Si). The station which has memorized (positioning of the flag) that is was the last station of the asynchronous loop to have the token before the passage of the latter to the synchronous loop, immediately catches the token thus transmitted. This station, now being in possession of the token, then performs the normal operations of a station being in possession of the token as described previously, and the token again starts to circulate in the sequential mode until another interruption takes place due to the expiration of the predetermined time interval.

The example of a communication network comprising two logic loops of different priority is not limitative and the invention is also applicable to communication networks comprising more than two logic loops of different priority. This more general application of the invention will be described in brief hereinafter. In this more general application the progress of the token will be interrupted each time when a logic loop having a priority level which is higher than that in which the token circulates must be served. Each station now comprises as many time counters (such as the time counting device 17 in FIG. 2) as there are logic loops having a priority level which is higher that that of the logic loop of lowest priority whereto said station belongs. Each of these time counters will thus be assigned to a well-defined logic loop and will determine the predetermined time interval of this logic loop. When a counter generates an interrupt signal because its predetermined time interval has expired, the token returns to the initial entrance point of the logic loop whereto the counter is assigned, regardless of its position. This return may not take place directly because the return levels must be saved; consequently, the station interrupted by the expiration of the predetermined time interval transfers the token to the initial entrance point of the logic loop of next-higher priority compared to the loop which includes the interrupted station. The entrance point thus reached known (like all other stations of the network) that the predetermined time interval has expired, and memorizes the priority level of the loop having transferred the token thereto; immediately thereafter it transfers the token to a logic loop of higher priority and so on until the token arrives in the loop which contains the counter having caused the interruption. It is to be understood that the predetermined time interval has a duration such that, when the maximum return time of the token which depends notably on the number of logic loops is added, the token still arrives at the desired instant in the logic loop to be served.

The predetermined time interval counter is started after the interruption when the token starts to circulate in the channel.

When the token descends to the logic loops of lower priority again, it will again start to traverse each logic loop completely, except when it arrives in the loop where the interrupted station is situated because in the token will then be immediately assigned to the station which has not been able to use the token because of the described interruption.

When a second interruption occurs during the descent of the token before it has reached the loop previously interrupted, the same iterative method is executed.

In the case of a network comprising, for example, four logic loops, a suitable assignment of the stations would be: to the loop having the priority 3 (the highest priority): the producers DOR or other stations imposing the same type of requirements; to the loop having the priority 2: the synchronous terminals, for example, digital telephones; to the loop having the priority 1: the producer-type asynchronous terminals; to the loop having the priority 0: the consumer-type asynchronous terminals.

In certain cases it may be interesting to dissociate the terms station and station address so that according to a complementary method which also forms part of the invention, an arbitrary station can have several addresses; each of these addresses of the same arbitrary station is thus assigned (in the network) the priority of the loop in which it is situated; each station can thus be privileged twice, on the hand because of its multiple addresses and on the other hand because of the priority level of each of its addresses; a high-traffic automatic digital telephone exchange is a suitable example of a station justifying several addresses which, in this non-limitative case, would all be in the same loop having the priority 1 as described above.

During the normal execution of the method in accordance with the invention and when the last station of the last loop has had the token, which means that the token has completed a complete cycle of the loop of lowest priority before expiration of the predetermined time interval, the method has two options within the scope of the invention: either the token continues to circulate in the loop of lowest priority while awaiting the interruption, or the token returns directly to the entrance point of the loop of highest priority without awaiting the interruption.

What is claimed is:

1. A method for allocating a right to transmit to different stations which form part of a decentralized communication network, and each of which is connected to a data traffic channel for the transmission of data, a right to transmit being allocated to the various stations by means of a token, at least one priority level indicating a frequency of allocation of the token being assigned to each station, stations having the same priority level forming part of a group and assigned to a logic loop for the circulation of the token, said token is successively allocated to the stations of the same logic loop and, after said token has been allocated to all stations of the same logic loop, said token passes to another logic loop formed by a group of stations having a lower priority level, the station receiving the token having the right to transmit data having a priority level corresponding to that assigned to the logic loop in which the token circulates, said circulation of the token in a first logic loop being interrupted under control of an interrupt signal generated by a station possessing the token, said interrupt signal being generated upon expiration of a time interval representing a time duration between two successive allocations of the token to a station assigned to a second logic loop having a priority level which is higher than that of the first logic loop, said token then being allocated to a station of said second logic loop under the control of said interrupt signal.

2. An allocation method as claimed in claim 1, characterized in that when the token returns to the first logic loop after circulation through the second logic loop, the right to transmit is allocated first of all to the station which possessed this right to transmit when the interrupt signal was generated.

3. An allocation method as claimed in claim 1, wherein for each group of stations assigned to the same logic loop a station is indicated to first receive the right to transmit when the token passes from one logic loop to another under the control of said interrupt signal.

4. An allocation method as claimed in claim 3, wherein in said time interval between two successive allocations of the token cooresponds to a predetermined time interval between two successive allocations of the token to said station designated to first receive the right to transmit.

5. An allocation method as claimed in any of the preceding claims, characterized in that the duration of said time interval is less than 10 milliseconds.

6. A decentralized communication network comprising a plurality of stations, each of which is connected to a data traffic channel and comprises token allocation means for receiving a right to transmit a message on a channel when a token is allocated thereto, and for organizing a transfer of said token to a predetermined station, at least one priority level indicating a frequency of allocation of said token being assigned to each station, said stations having the same priority level forming part of a group and are assigned to a first logic loop for the circulation of said token, the network comprises at least two different groups, said predetermined station whereto said token is transferred being a next station of said logic loop or a station which belongs to a second logic loop formed by a group of stations to which there is assigned a lower priority level when said token has been allocated to all stations of said first logic loop, with each priority level there being associated a predetermined time interval which corresponds to a period of time expiring between two successive allocations of said token by the allocation means of a station of a group assigned to said associated priority level, the stations having an assigned priority level which is lower than the highest priority level comprising a time counting device for counting the duration of said time intervals corresponding to the priority levels which are higher than that of the station itself, said counting device being provided in order to generate an interrupt signal upon expiration of one of said time intervals and being connected to said token allocation means for supplying said interrupt signal and for transferring an indication which indicates for which priority level the time interval has expired, said token allocation means being provided for interrupting under control of said interrupt signal, said transfer of the token of said predetermined station and to organize the transfer of the token to a station of the group indicated by said indication.

7. A communication network as claimed in claim 6, wherein the time counting device comprises a time counting element for each group having a priority level which is higher than that of its own group, each counting element counting the duration of said time interval of the group whereto it is assigned.

8. A communication network as claimed in claim 6 or 7, wherein the network comprises two logic loops.

9. A communication network as claimed in claim 7, wherein the time counting element is resettable under the control of the interrupt signal.

* * * * *